(12) United States Patent
Kar-Roy

(10) Patent No.: US 8,098,351 B2
(45) Date of Patent: Jan. 17, 2012

(54) SELF-PLANARIZED PASSIVATION DIELECTRIC FOR LIQUID CRYSTAL ON SILICON STRUCTURE AND RELATED METHOD

(75) Inventor: Arjun Kar-Roy, Irvine, CA (US)

(73) Assignee: Newport Fab, LLC, Newport Beach, CA (US)

( * ) Notice: Subject to any disclaimer, the term of this patent is extended or adjusted under 35 U.S.C. 154(b) by 91 days.

(21) Appl. No.: 12/157,881

(22) Filed: Jun. 13, 2008

(65) Prior Publication Data

US 2009/0128768 A1    May 21, 2009

Related U.S. Application Data

(60) Provisional application No. 61/003,999, filed on Nov. 20, 2007.

(51) Int. Cl.
*G02F 1/1333* (2006.01)
(52) U.S. Cl. ............ 349/113; 349/122; 349/138
(58) Field of Classification Search ............ None
See application file for complete search history.

(56) References Cited

U.S. PATENT DOCUMENTS

| | | | | |
|---|---|---|---|---|
| 5,056,895 | A | * | 10/1991 | Kahn ................ 349/114 |
| 5,892,563 | A | * | 4/1999 | Ono et al. .......... 349/143 |
| 6,017,780 | A | * | 1/2000 | Roy ................... 438/152 |
| 6,300,241 | B1 | * | 10/2001 | Moore et al. ....... 438/637 |
| 6,521,475 | B1 | * | 2/2003 | Chen et al. .......... 438/34 |
| 6,569,699 | B1 | * | 5/2003 | Lin et al. ............. 438/30 |
| 6,828,595 | B2 | * | 12/2004 | Leng .................. 257/98 |
| 2002/0047965 | A1 | * | 4/2002 | Suzuki et al. ....... 349/113 |
| 2004/0046911 | A1 | * | 3/2004 | McKnight .......... 349/113 |
| 2004/0097069 | A1 | * | 5/2004 | Weng et al. ........ 438/631 |
| 2007/0287211 | A1 | * | 12/2007 | Wu .................... 438/30 |

* cited by examiner

*Primary Examiner* — Mike Stahl
(74) *Attorney, Agent, or Firm* — Farjami & Farjami LLP

(57) ABSTRACT

According to an exemplary embodiment, a liquid crystal on silicon (LCoS) structure includes a number of pixel electrodes overlying an interlayer dielectric, where diagonally adjacent pixel electrodes are separated by a gap. The LCoS structure further includes a self-planarizing passivation dielectric situated over the pixel electrodes and in the gap, where the self-planarizing passivation dielectric has a selected thickness. The self-planarizing passivation dielectric can be an Oxide-Nitride-Oxide (ONO) stack. The selected thickness of the self-planarizing passivation dielectric causes the self-planarizing passivation dielectric to have a substantially planar top surface. In one embodiment, the thickness of the self-planarizing passivation dielectric can be approximately equal to twice a width of the gap.

20 Claims, 5 Drawing Sheets

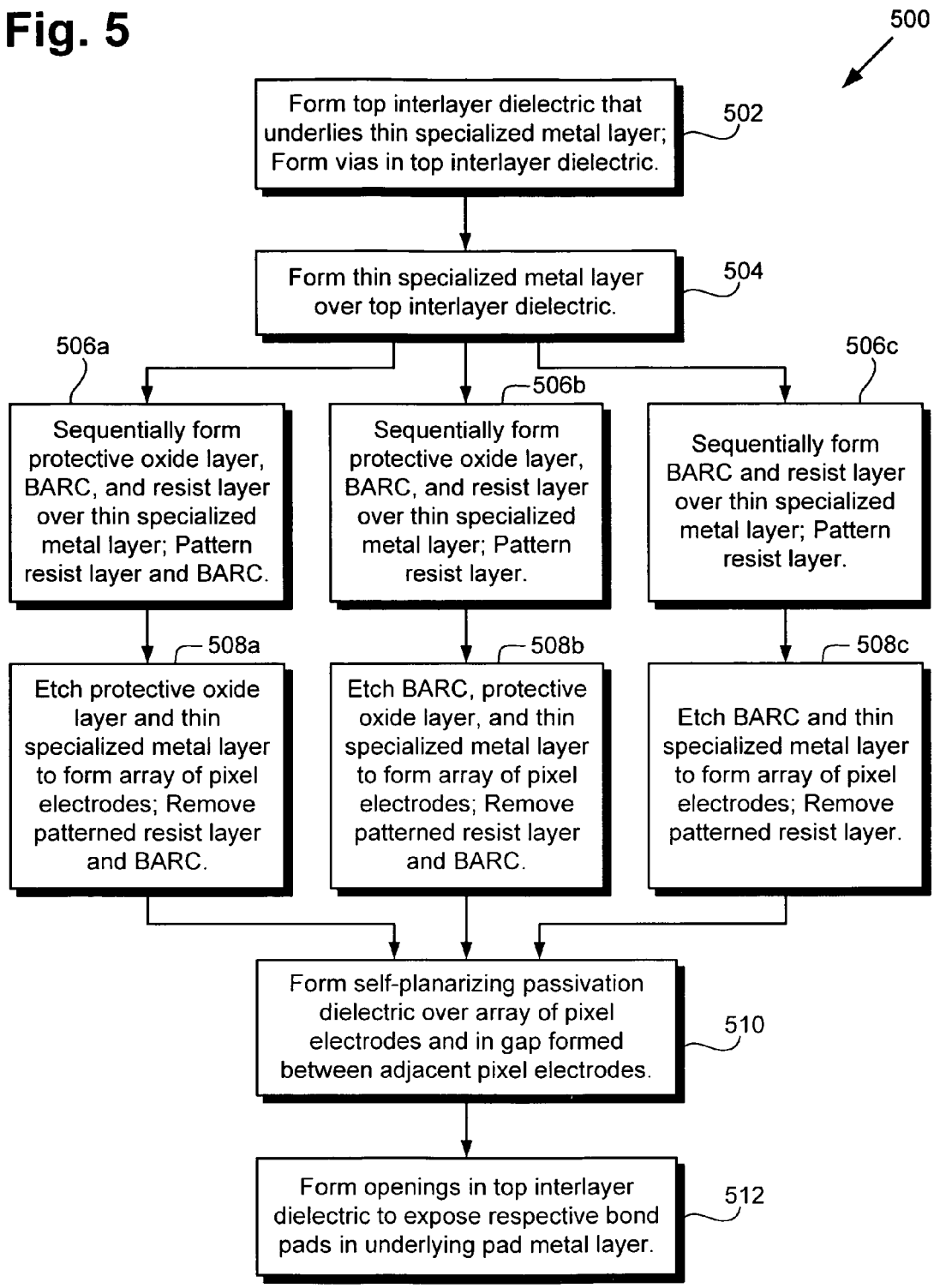

SELF-PLANARIZED PASSIVATION DIELECTRIC FOR LIQUID CRYSTAL ON SILICON STRUCTURE AND RELATED METHOD

The present application claims the benefit of and priority to a pending provisional patent application entitled "Self-Planarized Passivation for Liquid Crystal on Silicon Structure," Ser. No. 61/003,999 filed on Nov. 20, 2007. The disclosure in that pending provisional application is hereby incorporated fully by reference into the present application.

BACKGROUND OF THE INVENTION

1. Field of the Invention

The present invention generally relates to the field of semiconductor structures and processes. More particularly, the invention relates to planarization methods and structures used in semiconductor processing.

2. Background Art

Liquid Crystal on Silicon (LCoS) devices can be utilized to create high-resolution images in electronic devices, such as televisions and other types of displays. In a television, for example, a separate LCoS device is required for each color (blue, green, and red). Each LCoS device can include a liquid crystal, which includes polarizing layers of liquid crystal molecules, overlying an array of pixel electrodes, which can be formed in a top metal layer of a semiconductor structure. In the LCoS device, a voltage can be applied to each pixel electrode to control an amount of light passing through an overlying portion of the liquid crystal. To achieve effective operation, the pixel electrodes in the semiconductor structure typically include a highly reflective metal, such as aluminum. For proper integration and alignment with the liquid crystal, the semiconductor structure underlying the liquid crystal requires a passivation layer with a substantially planar top surface.

Conventionally, substantially planar passivation layer overlying the pixel electrodes in the semiconductor structure can be provided by depositing an interlayer dielectric over the pixel electrodes and in the gaps between adjacent pixel electrodes. The interlayer dielectric can be planarized by utilizing a suitable planarizing process, such as a chemical mechanical polishing (CMP) process, followed by an etch back process to expose the top surfaces of the pixel electrodes. An Oxide-Nitride-Oxide (ONO) stack can then be formed over the pixel electrodes and the dielectric material remaining in the gaps between the adjacent pixel electrodes to provide a passivation layer having a substantially planar top surface. However, to achieve a substantially planar passivation layer overlying the pixel electrodes in the semiconductor structure, the conventional approach requires planarization and etch back steps, which are undesirably complicated to perform.

SUMMARY OF THE INVENTION

Self-planarized passivation dielectric for liquid crystal on silicon structure and related method, substantially as shown in and/or described in connection with at least one of the figures, as set forth more completely in the claims.

BRIEF DESCRIPTION OF THE DRAWINGS

FIG. 5 shows a flowchart illustrating the steps taken to implement an embodiment of the present invention.

DETAILED DESCRIPTION OF THE INVENTION

The present invention is directed to a self-planarized passivation dielectric for liquid crystal on silicon structure and related method. The following description contains specific information pertaining to the implementation of the present invention. One skilled in the art will recognize that the present invention may be implemented in a manner different from that specifically discussed in the present application. Moreover, some of the specific details of the invention are not discussed in order to not obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention which use the principles of the present invention are not specifically described in the present application and are not specifically illustrated by the present drawings.

Figure 1:
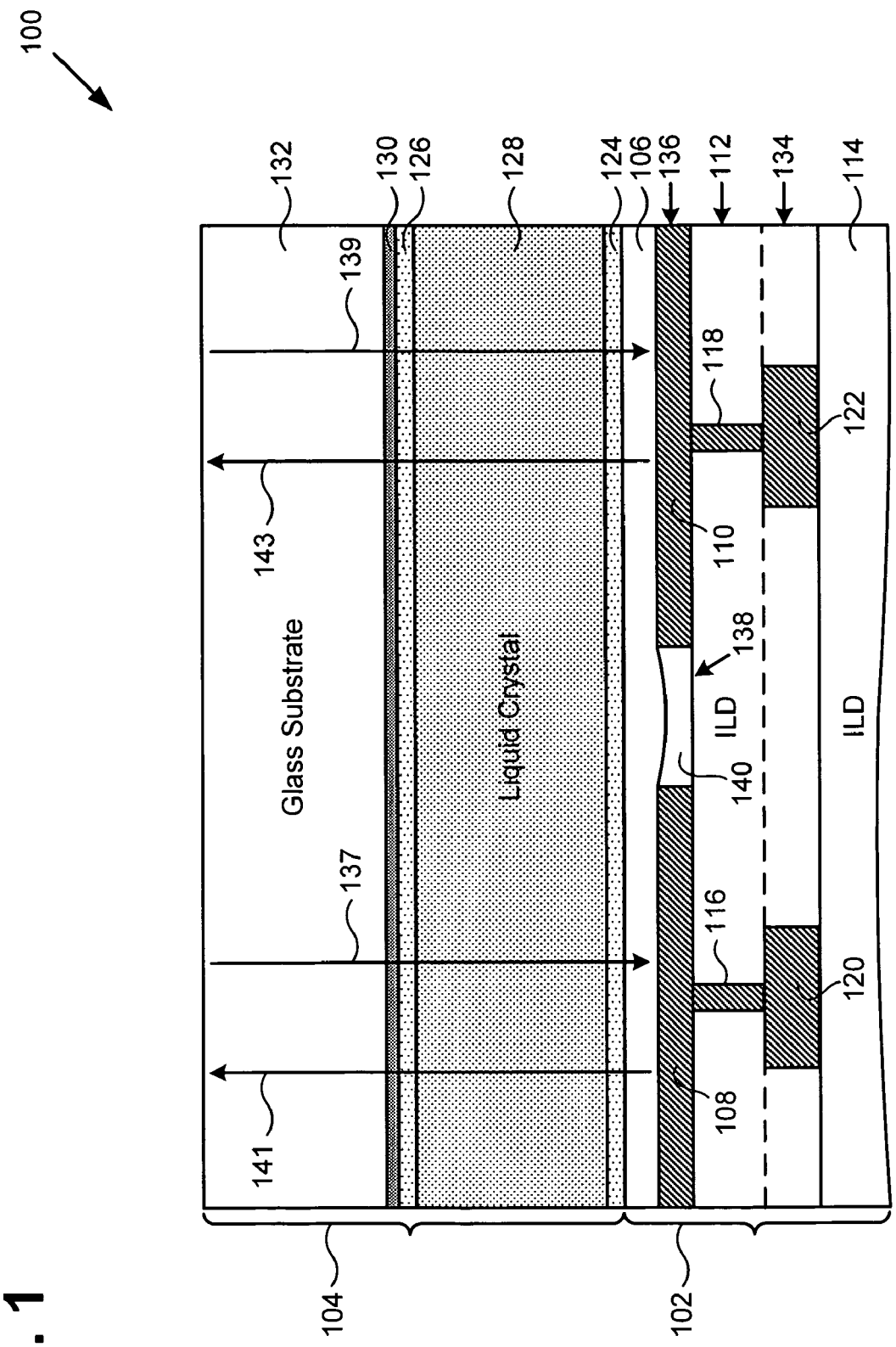
FIG. 1 illustrates a cross-sectional view of a portion of an exemplary Liquid Crystal on Silicon (LCoS) structure.

FIG. 1 shows a cross-sectional view of a portion of an exemplary Liquid Crystal on Silicon (LCoS) device. Certain details and features have been left out of FIG. 1, which are apparent to a person of ordinary skill in the art. LCoS structure 100 is a portion of an LCoS device (also referred to as an "LCoS chip"), which can be used to provide images for display devices, such as rear projection TVs, PC monitors, viewfinders, heads-up displays, wearable displays, and projectors. For example, three LCoS devices can be utilized to provide respective blue, green, and red images, which can be appropriately combined to form a full color image in a display device, such as a rear projection TV. LCoS structure 100 includes semiconductor portion 102 and liquid crystal portion 104. Semiconductor portion 102, which is a semiconductor structure, includes passivation layer 106, pixel electrodes 108 and 110, interlayer dielectrics (ILDs) 112 and 114, vias 116 and 118, and metal segments 120 and 122. It is noted that pixel electrodes 108 and 110 are diagonally adjacent pixel electrodes in an array of pixel electrodes.

Semiconductor portion 102 can also include various elements that are not shown in FIG. 1, such as an underlying semiconductor die substrate including transistors, such as field effect transistors (FETs), for controlling the respective voltages on pixel electrodes, such as pixel electrodes 108 and 110. Semiconductor portion 102 can also include a capacitor (not shown in FIG. 1) coupled to each pixel electrode, where the capacitor can be utilized for voltage storage and for preventing unwanted variations in pixel electrode voltage. Semiconductor portion 102 can further include a peripheral area (not shown in FIG. 1), which includes bond pads for providing electrical connections to external circuitry. Semiconductor portion 102 can further include additional ILD(s) underlying ILD 114, which can include vias, and additional metal layers underlying metal layer 134, which can include metal interconnect segments and metal plates for capacitors. Liquid crystal portion 104 of LCoS structure 100 includes alignment layers 124 and 126, liquid crystal 128, transparent electrode 130, and glass substrate 132.

As shown in FIG. 1, metal segments 120 and 122, which can comprise aluminum or other suitable metal, are situated over ILD 114, which can comprise silicon oxide or other suitable dielectric material. Metal segments 120 and 122 are situated in metal layer 134, which can be, for example, a fifth (i.e. M5) metal layer in the semiconductor die. ILD 114 can be situated over a silicon substrate, which is not shown in FIG. 1. One or more ILDs (not shown in FIG. 1) and one or more interconnect metal layers (not shown in FIG. 1) can be situated between ILD 114 and the silicon substrate. Also shown in FIG. 1, ILD 112, which can comprise a similar dielectric material as ILD 114, is situated over metal layer 134 and includes vias 116 and 118. Vias 116 and 118, which can comprise a suitable conductive material, such as tungsten, are in electrical contact with respective metal segments 120 and 122 and can be formed in ILD 112 in a manner known in the art.

Further shown in FIG. 1, pixel electrodes 108 and 110, which are diagonally adjacent pixel electrodes, are situated over ILD 112 and are in electrical contact with respective vias 116 and 118. Pixel electrodes 108 and 110 are also situated in metal layer 136, which is the top metal layer in the semiconductor die. Thus, for example, if the semiconductor die has six metal layers, metal layer 136 would be the sixth (i.e. M6) metal layer in the die. Metal layer 136 can comprise aluminum, an aluminum stack including layers of titanium nitride and titanium, or other suitable metal layers or stack of metal layers. Pixel electrodes 108 and 110 are situated in an array of pixel electrodes (not shown in FIG. 1), which can include, for example, 1200×1000 pixel electrodes. The pixel electrodes (e.g. pixel electrodes 108 and 110) in the pixel electrode array can be formed by appropriately masking and etching metal layer 136. Also shown in FIG. 1, pixel electrodes 108 and 110 are separated by gap 138, which is filled by dielectric segment 140. Dielectric segment 140 can comprise silicon oxide or other suitable dielectric material.

Further shown in FIG. 1, passivation layer 106 is situated over dielectric segment 140 and pixel electrodes 108 and 110 and can comprise, for example, a layer of nitride situated over a layer of oxide. Passivation layer 106 can be utilized to protect the highly reflective surfaces of pixel electrodes 108 and 110. It is important for passivation layer 106 to have a highly planar top surface so that liquid crystal 128 can be properly aligned with the pixel electrodes. Also shown in FIG. 1, alignment layer 124 is situated over passivation layer 106 and can comprise silicon oxide or other suitable transparent dielectric material. Alignment layer 124 can be utilized to achieve a desired alignment between the liquid crystal molecules in liquid crystal 128 and the pixel electrodes when a voltage is not applied to the pixel electrodes.

Further shown in FIG. 1, liquid crystal 128 is situated over alignment layer 124 and can comprise polarizing layers of liquid crystal molecules. The alignment of the polarizing layers, which can control the amount of light that passes through liquid crystal 128, can be controlled by the voltage applied across it (i.e. liquid crystal 128). For example, the amount of light that passes through a portion of liquid crystal 128 overlying a pixel electrode, such as pixel electrode 108, can be controlled by controlling the difference between the voltage applied to the pixel electrode and the voltage applied to transparent electrode 130. Also shown in FIG. 1, alignment layer 126 is situated over liquid crystal 128 and can comprise a similar dielectric material as alignment layer 124. Further shown in FIG. 1, transparent electrode 130 is situated over alignment layer 124 and can comprise, for example, a layer of indium tin oxide (ITO). Transparent electrode 130 can be formed, for example, by coating the bottom surface of glass substrate 132 with indium tin oxide. Also shown in FIG. 1, glass substrate 132 is situated over transparent electrode 130 and provides a solid, transparent protective covering for the underlying portion of LCoS structure 100.

During operation of an LCoS device that includes LCoS structure 100, a substantially constant voltage can be applied to transparent electrode 130, which extends over liquid crystal 128 and an array of pixel electrodes including pixel electrodes 108 and 110. By controlling a voltage applied to each pixel electrode, the voltage across the portion of liquid crystal 128 overlying the pixel electrode can be controlled. As a result, the amount of light that passes through the liquid crystal to the underlying pixel electrode can be controlled. For example, the difference between the voltage applied to transparent electrode 130 and the voltage applied to pixel electrode 108 can control the amount of light that passes through the portion of liquid crystal 128 overlying pixel electrode 108. The light that passes through liquid crystal 128 to pixel electrodes 108 and 110 is indicated by respective arrows 137 and 139. The light that passes through liquid crystal 128 is reflected back through the liquid crystal and glass substrate 132, as indicated by respective arrows 141 and 143, by the highly reflective top surfaces of the pixel electrodes, such as pixel electrodes 108 and 110. The light reflected through glass substrate 132 from the surfaces of the pixel electrodes can be form an image, which can be provided by the LCoS device.

However, to achieve an LCoS device that operates effectively, pixel electrodes, such as pixel electrodes 108 and 110, in semiconductor portion 102 are required to have top surfaces that are highly reflective and substantially planar. Also, for proper integration and alignment with liquid crystal portion 104, passivation layer 106, which overlies the pixel electrodes, is required to have a substantially planar top surface. A conventional approach for achieving a substantially planar passivation layer for a semiconductor portion of an LCoS structure including pixel electrodes having highly reflective top surfaces is discussed below in relation to FIG. 2.

Figure 2:
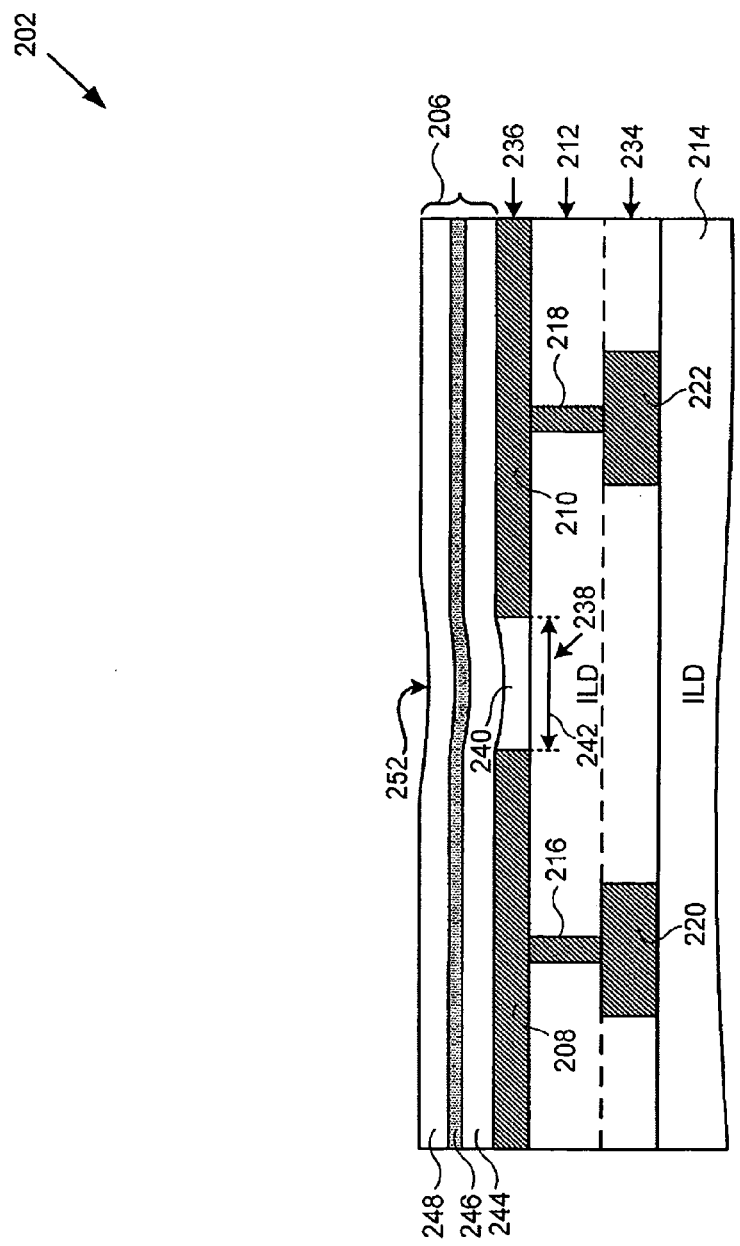
FIG. 2 illustrates a cross-sectional view of a conventional exemplary semiconductor portion of an exemplary LCoS structure.

FIG. 2 shows a cross-sectional view of a conventional exemplary semiconductor portion of an exemplary LCoS structure. Conventional semiconductor portion 202 in FIG. 2 is similar to semiconductor portion 102 in LCoS structure 100 in FIG. 1. In conventional semiconductor portion 202, pixel electrodes 208 and 210, ILDs 212 and 214, vias 216 and 218, metal segments 220 and 222, metal layers 234 and 236, and gap 238 correspond, respectively, to pixel electrodes 108 and 110, ILDs 112 and 114, vias 116 and 118, metal segments 120 and 122, metal layers 134 and 136, and gap 138 in semiconductor portion 102 in FIG. 1. Also, conventional semiconductor portion 202 includes an underlying semiconductor substrate including transistors, such as FETs, for controlling the respective voltages applied to pixel electrodes 208 and 210 and associated metal segments and vias as discussed above, which are not shown in FIG. 2.

As shown in FIG. 2, metal segments 220 and 222 are situated over ILD 214, ILD 212, which is the top interlayer dielectric in the semiconductor die, is situated over metal segments 220 and 222, pixel electrodes 208 and 210 are situated over ILD 212, and vias 216 and 218 connect respective pixel electrodes 208 and 210 to metal segments 220 and 222. Also shown in FIG. 2, pixel electrodes 208 and 210 are separated by gap 238, which is filled with oxide segment 240 and has width 242. Further shown in FIG. 2, Oxide-Nitride- Oxide (ONO) stack 206 is situated over pixel electrodes 208 and 210 and dielectric segment 240. ONO stack 206 includes oxide layer 244, nitride layer 246, which overlies oxide layer 246, and oxide layer 248, which overlies nitride layer 246. Other combinations of the stacks such as oxide only, Oxide-Nitride (ON), ONO, and Oxide-Nitride-Oxide-Nitride (ONON) may also be used and the individual film thicknesses are optimized to enhance reflectivity of the pixel electrode. ONO stack 206 is utilized in conventional semiconductor portion 202 for a passivation dielectric and corresponds to passivation layer 106 in semiconductor portion 102 in FIG. 1. The top surface of ONO stack 206 includes a small-size depression, i.e. depression 252.

In conventional semiconductor portion 202, pixel electrodes 208 and 210 can be formed by depositing a top metal layer, i.e. metal layer 236, over ILD 212 and thinning the top metal layer to a thickness of, for example, approximately 2000.0 Angstroms. The top metal layer can comprise aluminum, a metal stack including layers of aluminum, titanium nitride, and titanium, or other suitable metal or metal stack. The top metal layer can then be patterned to form pixel electrodes, such as pixel electrodes 208 and 210, which are diagonally adjacent pixel electrodes and which are separated by gap 238. An interlayer dielectric can then be deposited over pixel electrodes 208 and 210 and in gap 238.

The interlayer dielectric deposition can include, for example, depositing one layer of oxide, two layers of oxide, or a layer of oxide and a layer of nitride over the pixel electrodes. The interlayer dielectric can then be planarized by utilizing a CMP (chemical mechanical polishing) process or other suitable planarizing process. Next, an etch back process can be performed on the interlayer dielectric to expose the top surfaces of pixel electrodes 208 and 210. After the etch back process has been performed, gap 238 remains filled with oxide, i.e. oxide segment 240. ONO stack 206 can then be deposited over pixel electrodes 208 and 210 and oxide segment 240. The oxide only, ON, ONO, or ONON stack also enhances the reflectivity of the pixel electrode.

As a result of the conventional process discussed above, a substantially planar passivation dielectric comprising an ONO stack is formed over pixel electrodes 208 and 210. However, the conventional process requires planarization and etch back steps, which are complicated steps, prior to forming the ONO stack so as to achieve a substantially planar passivation dielectric top surface over the pixel electrodes.

Figure 3:
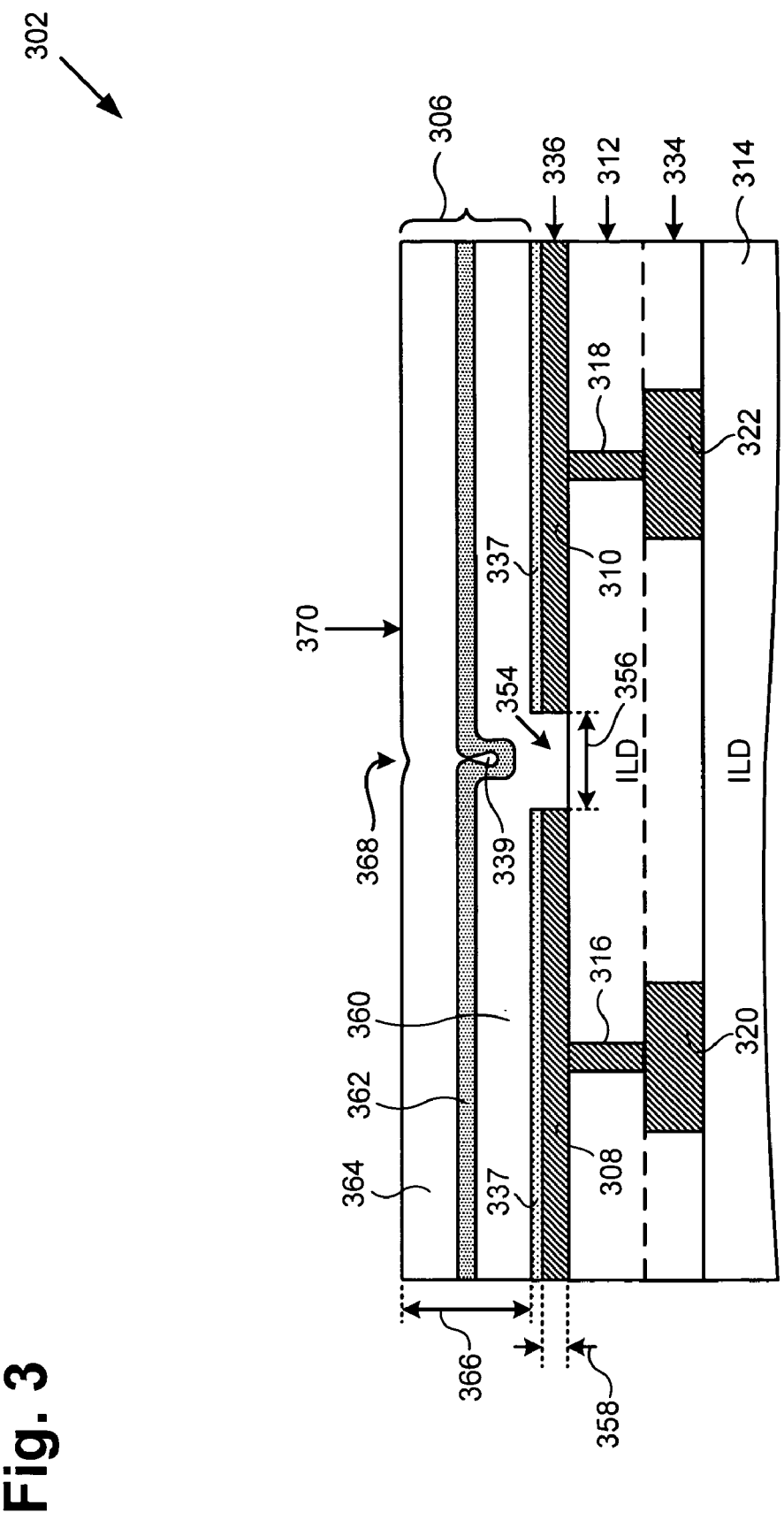
FIG. 3 illustrates a cross-sectional view of an exemplary semiconductor portion of an exemplary LCoS structure including a self-planarizing passivation dielectric in accordance with one embodiment of the present invention.

FIG. 3 shows a cross-sectional view of an exemplary semiconductor portion of an exemplary LCoS structure in accordance with one embodiment of the present invention. Semiconductor portion 302 in FIG. 3 can provide a self-planarized passivation dielectric for integration with liquid crystal portion 104 in LCoS structure 100 in FIG. 1. In semiconductor portion 302, ILDs 312 and 314, vias 316 and 318, metal segments 320 and 322, and metal layer 334 correspond, respectively, to ILDs 112 and 114, vias 116 and 118, metal segments 120 and 122, and metal layer 134 in semiconductor portion 102 in FIG. 1. Also, semiconductor portion 302 includes an underlying semiconductor substrate (not shown in FIG. 3), which includes transistors, such as FETs, for controlling the respective voltages applied to pixel electrodes 308 and 310. Semiconductor portion 302 can also include a capacitor (not shown in FIG. 3) coupled to each pixel electrode, where the capacitor can be utilized for voltage storage and can also be utilized for preventing unwanted variations in pixel electrode voltage. Semiconductor portion 302 can further include a peripheral area (not shown in FIG. 3), which includes bond pads for providing electrical connections to external circuitry, additional ILD(s) below ILD 314, which can include vias, and additional metal layers, which can include metal interconnect segments and metal capacitor plates.

As shown in FIG. 3, metal segments 320 and 322 are situated over ILD 314, ILD 312 is situated over metal segments 320 and 322, pixel electrodes 308 and 310 are situated over ILD 312 and are separated by gap 354, and vias 316 and 318 are situated in ILD 312 and connect respective pixel electrodes 308 and 310 to metal segments 320 and 322. The top surface of the ILD 312 needs to be substantially planarized using well known process steps such as chemical mechanical processing (CMP). This is also required for top surface of stack 306 to have good planarization. Gap 354 has width 356, which is the distance between the corners of diagonally adjacent pixel electrodes, such as pixel electrodes 308 and 310. In one embodiment, width 356 of gap 354 can be, for example, between approximately 0.2 microns and approximately 0.36 microns. Metal segments 320 and 322 are situated in metal layer 334 (also referred to as a "pad metal layer") which can be, for example, the fifth (i.e. M5) metal layer in the semiconductor die. Metal layer 334 is the metal layer that is situated one metal layer below the top metal layer, i.e. thin specialized metal layer 336, in the semiconductor die. It is noted that, in general, depending on how many metal layers reside in the die, metal layer 334 can be the four (i.e. M4), the three (i.e. M3), or lower metal layer in the die. Metal layer 334 is significantly thicker than the top metal layer, i.e. thin specialized metal layer 336, and is also utilized for bond pad formation. ILD 312 can be formed by depositing a layer of silicon oxide or other suitable dielectric material over metal layer 334 in a manner known in the art.

Pixel electrodes 308 and 310 are situated in thin specialized metal layer 336, which is the top metal layer in the semiconductor die, and are separated by gap 354, which has width 356. Thus, for example, if the semiconductor die has six metal layers, thin specialized metal layer 336 would be in the sixth (i.e. M6) metal layer in the die. In the present embodiment, thin specialized metal layer 336 can be a metal stack comprising a layer of titanium (Ti), which is situated over ILD 312, a layer of titanium nitride (TiN), which is situated over the layer of titanium, and a top layer of aluminum situated over the layer of titanium nitride. In other embodiments, thin specialized metal layer 336 may comprise a layer of aluminum or other suitable metal or metal stack. Thin specialized metal layer 336 has thickness 358, which in one embodiment can be, for example, approximately 100.0 Angstroms. In other embodiments, thickness 358 of thin specialized metal layer 336 can be, for example, between 500.0 Angstroms and 2000.0 Angstroms. The aluminum layer in the metal stack, which is utilized to provide a highly reflective surface can, in one embodiment, have a thickness of, for example, approximately 700.0 Angstroms.

Thin specialized metal layer 336 can be formed over ILD 312 by depositing a blanket metal stack comprising a layer of titanium overlying ILD 312, a layer of titanium nitride overlying the layer of titanium, and a layer of aluminum overlying the layer of titanium nitride. During the deposition process, the deposition temperature can be reduced from a typical temperature of between approximately 200.0° C. and approximately 240.0° C. to a lower temperature of approximately 160.0° C. to achieve a thin metal stack with a layer of aluminum having a smaller grain size, which advantageously increases reflectivity of the aluminum layer. The thin metal stack provided by the invention also has reduced hillock formation, thereby providing a substantially planar top surface.

After thin specialized metal layer 336 has been formed, protective oxide layer 337 comprising a thin layer of silicon oxide can be deposited on the top surface of the layer of aluminum in the metal stack so as to protect the metal surface from damage during subsequent processing. Protective oxide layer 337 can be deposited by utilizing a chemical vapor deposition (CVD) process or other suitable deposition processes. In one embodiment, protective oxide layer 337 can have a thickness of, for example, approximately 80.0 Angstroms. Protective oxide layer 337 helps preserve the top surface of the pixel electrode from any surface damage, which could deteriorate the reflectivity, during subsequent pattern and strip processes. A bottom anti-reflective coating (BARC), which is developable and which can comprise an organic BARC material as is known in the art, can be formed over protective oxide layer 337 by utilizing a suitable deposition process. The BARC is required to define the narrow spacings between the pixel electrodes. A layer of resist, such as photoresist, can then be formed over the BARC. The layer of resist and the BARC can be patterned by utilizing a photo process so as to form a mask over thin specialized metal layer 336. An etch process, such as a plasma etch process or other suitable etch process, can then be performed to remove portions of the stack of the thin protective oxide layer and the thin specialized metal layer that are not protected by the mask, thereby forming an array of pixel electrodes including pixel electrodes 308 and 310. Each pixel electrode in the pixel array can have, for example, a square shape. After the pixel electrodes have been formed, the mask comprising the patterned layer of resist and BARC can be removed by utilizing a suitable etch process. In another embodiment, the developable BARC may be replaced by an organic BARC which is not developable. The etch removes BARC, thin oxide, and thin metal.

In another embodiment, the thin protective layer on top of layer 336 can be an inorganic BARC. The inorganic BARC can be a thin stack of silicon oxynitride (SiON). The BARC coating step as described above can be skipped and the resist coated, patterned followed by etching of the thin inorganic BARC and the thin metal.

Also shown in FIG. 3, self-planarizing passivation dielectric 306 is situated over pixel electrodes 308 and 310 and also situated on ILD 312 in gap 354. Self-planarizing passivation dielectric 306 can comprise an ONO stack formed by oxide layer 360, which is situated over pixel electrodes 308 and 310 and also situated in gap 354, nitride layer 362, which is situated over oxide layer 360, and oxide layer 364, which is situated over nitride layer 362. In one embodiment, self-planarizing passivation dielectric 306 can comprise an Oxide-Nitride-Oxide-Nitride (ONON) stack. In another embodiment, self-planarizing passivation dielectric 306 can comprise a single layer of oxide or other suitable dielectric material. Self-planarizing passivation dielectric 306 has thickness 366 which, in one embodiment, can be approximately equal to twice width 356 of gap 354. In one embodiment, thickness 366 can be greater than twice width 356. To facilitate the manufacturing process, the thickness of oxide layer 360 can be, for example, approximately equal to the thickness of oxide layer 364.

As shown in FIG. 3, keyhole void 339 can form in a portion of nitride layer 362 overlying gap 354 as a result of low temperature dielectric deposition. It is important that keyhole void 339 be prevented from propagating to the top of self-planarizing passivation dielectric 306 so as to prevent keyhole void 339 from trapping process solvents, which can reduce the reliability of semiconductor portion 302. In an embodiment of the invention, keyhole void 339 can be prevented from propagating to the top of self-planarizing passivation dielectric 306 by reducing width 356 of gap 354 by utilizing a special optical proximity correction (OPC) technique, as discussed below in relation to FIG. 4. It is necessary for any keyhole voids (e.g. keyhole void 339) to be sealed off at the approximate center of the gap (e.g. gap 354) close to the pixel electrodes (e.g. pixel electrodes 308 and 310) to achieve a self-planarizing passivation dielectric (e.g. self-planarizing passivation dielectric 306).

Thickness 366 of self-planarizing passivation dielectric 306 can be appropriately selected to completely fill gap 354 and to minimize the size of trough 368 that forms on the portion of top surface 370 that overlies gap 354. As a result of appropriately selecting thickness 366, which can be selected to be approximately twice width 356 of gap 354, top surface 370 of self-planarizing passivation dielectric 306 is substantially planar. In an embodiment in which an aggressive OPC technique is utilized to minimize width 356 of gap 354, thickness 366 can be approximately one and a half (1.5) times width 356. Also, self-planarizing passivation dielectric 306 has enhanced reflectivity. Self-planarizing passivation dielectric 306 can be formed by, for example, sequentially depositing oxide layer 360, nitride layer 362, and oxide layer 364 over pixel electrodes 308 and 310 and in gap 354 by utilizing a plasma enhanced chemical vapor deposition (PECVD) process or other suitable deposition processes. Other combinations of the stacks such as oxide only, Oxide-Nitride (ON), ONO, and Oxide-Nitride-Oxide-Nitride (ONON) may also be used and the individual film thicknesses can be optimized to enhance reflectivity of the pixel electrode. The deposition process utilized to form self-planarizing passivation dielectric 306 can be performed at a deposition temperature of, for example, less than approximately 450.0° C.

After self-planarizing passivation dielectric 306 has been formed, ILD 312 can be etched in a peripheral region (not shown in FIG. 3) of the semiconductor die to expose underlying bond pads, which are formed in the pad metal layer, i.e. metal layer 334. Metal layer 334, which is the metal layer immediately below the top metal layer, i.e. thin specialized metal layer 336, is formed substantially thicker than the top metal layer so as to accommodate bond pads.

Thus, by forming a self-planarizing passivation dielectric with an appropriately selected thickness over pixel electrodes and in the gap formed between diagonally adjacent pixel electrodes, the invention advantageously achieves a substantially planar passivation surface over the pixel electrodes. Also, the invention achieves a substantially planar passivation surface without requiring complicated planarization and etch back steps, as required in a conventional process utilized in conventional semiconductor portion 202 in FIG. 2.

Figure 4:
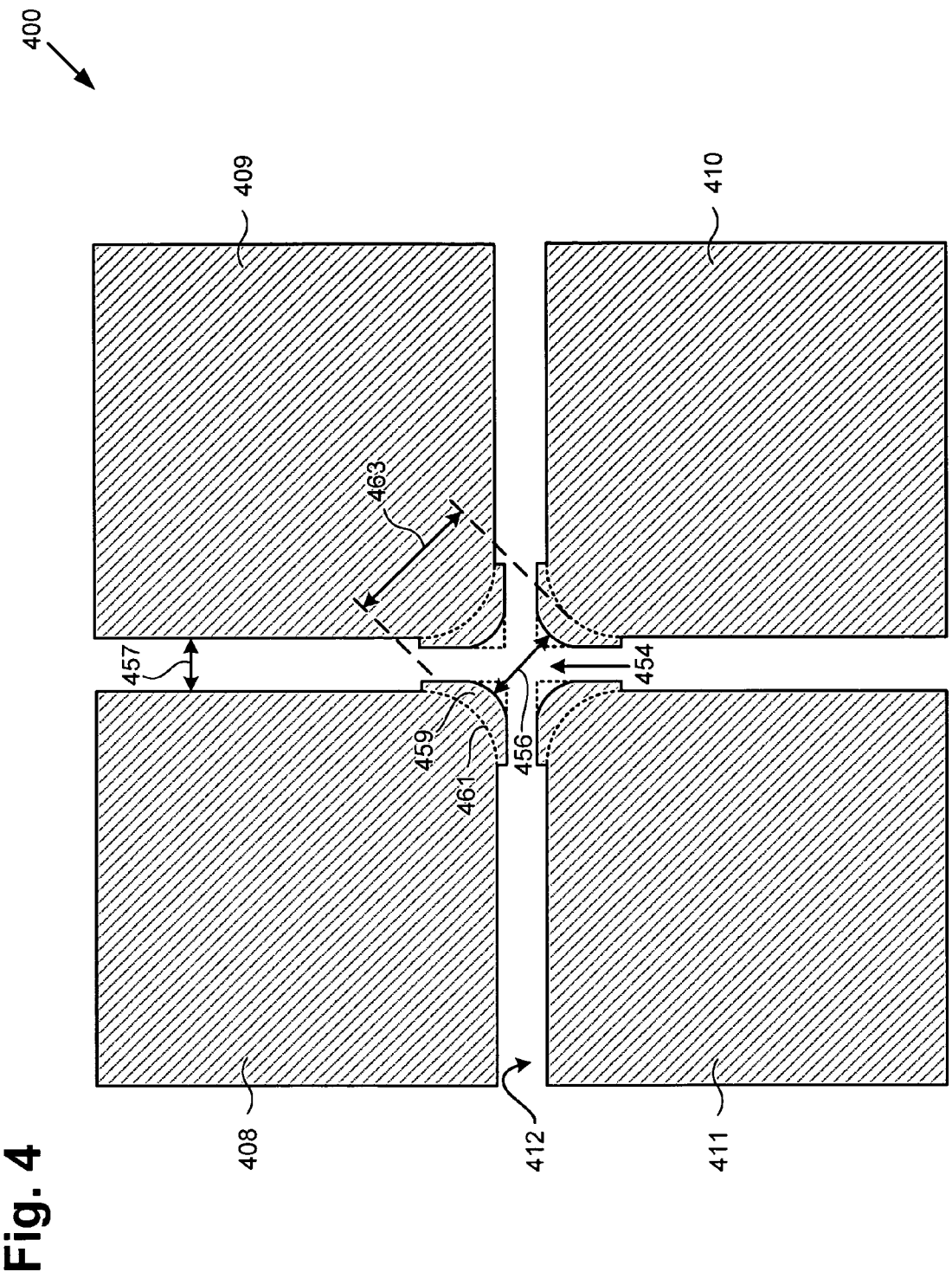
FIG. 4 illustrates a top view of an exemplary structure including exemplary pixel electrodes in accordance with one embodiment of the present invention.

FIG. 4 shows a top view of an exemplary structure including exemplary pixel electrodes in accordance with one embodiment of the present invention. In structure 400, pixel electrodes 408 and 410, ILD 412, gap 454, and width 456 correspond, respectively, to pixel electrodes 308 and 310, ILD 312, gap 354, and width 356. FIG. 4 shows a top view of pixel electrodes 408, 409, 410, and 411 prior to the formation of an overlying embodiment of the invention's self-planarizing passivation dielectric (e.g. self-planarizing passivation dielectric 306). Pixel electrodes 408, 409, 410, and 411 can be a portion of an array of pixel electrodes that are formed in the top metal layer of a semiconductor die in an LCoS structure (e.g. LCoS structure 100 in FIG. 1).

As shown in FIG. 4, pixel electrodes 408, 409, 410, and 411 are situated over ILD 412. The sides of adjacent pixel electrodes, such as pixel electrodes 408 and 409, are separated by distance 457, which can be minimized in accordance with minimum design rule requirements. Also shown in FIG. 4, serif 459 is situated at the corner of each pixel electrode and can be formed by utilizing a special OPC technique. After a portion of serif 459 has been sacrificed during formation of the pixel electrodes, diagonally adjacent pixel electrodes, such as pixel electrodes 408 and 410, remain separated by gap 454, which has width 456. As shown in FIG. 4, diagonally adjacent pixel electrodes, such as pixel electrodes 408 and 410 refer to adjacent pixel electrodes that are situated along a line that extends through opposite corners of each pixel electrode. In other embodiments, other more complex OPC techniques can also be used to tailor the pixel electrode edges so as to minimize width 456 of gap 454.

If the OPC technique is not utilized to form serif 459, corner rounding, indicated by dashed line 461, which typically occurs during the photo process, can cause the gap at the corners of adjacent pixel electrodes, such as pixel electrodes 408 and 410, to have width 463, which is much larger than width 456. Thus, by utilizing a special OPC technique to form serif 459 at the corner of each pixel electrode, the present invention advantageously achieves a reduced gap width between the corners of diagonally adjacent pixel electrodes. Also, by utilizing a special OPC technique to achieve a reduced gap width (i.e. a reduced with 456 of gap 454), the present invention advantageously prevents a keyhole void (e.g. keyhole void 339 in FIG. 3) that may form in self-planarizing dielectric 306 from propagating to the top of self-planarizing passivation dielectric 306 and, thereby, trapping process solvents, which can reduce reliability of the semiconductor portion of the LCoS structure. Also, as discussed above, any keyhole voids in self-planarizing passivation dielectric 306 need to be sealed off at the approximate center of the gap (e.g. gap 454) near the pixel electrodes (e.g. pixel electrodes 408 and 410) to achieve a self-planarizing passivation dielectric.

FIG. 5 shows a flowchart illustrating an exemplary method according to one embodiment of the present invention. Certain details and features have been left out of flowchart 500 that are apparent to a person of ordinary skill in the art. For example, a step may consist of one or more substeps or may involve specialized equipment or materials, as known in the art. It is noted that the processing steps shown in flowchart 500 are performed on a portion of a processed wafer, which, prior to step 502 of flowchart 500, includes, among other things, metal layer 334, which includes metal segments 320 and 322, and ILD 314. The portion of the processed wafer also includes elements not shown in FIG. 3, such as a silicon substrate, transistors situated on the substrate, associated vias and metal segments, and ILD(s) and metal layer(s) that may be situated between the substrate and ILD 314. In flowchart 500, steps 506a and 508a, steps 506b and 508b, or steps 506c and 508c can be alternatively performed between steps 504 and 510 in respective embodiments of the invention.

At step 502 of flowchart 500, ILD 312, which is the top interlayer dielectric that underlies thin specialized metal layer 336 in FIG. 3, is formed. ILD 312 can be formed by, for example, utilizing a suitable deposition process as is known in the art to deposit a layer of silicon oxide or other suitable dielectric material over metal layer 334. After ILD 312 has been formed, vias 316 and 318 can be formed in ILD 312 such that the vias are in contact with respective metal segments 320 and 322.

At step 504, thin specialized metal layer 336 is formed over ILD 312 is formed over thin specialized metal layer 336. Thin specialized metal layer 336 can be formed by, for example, depositing a blanket metal stack comprising a layer of titanium overlying ILD 312, a layer of titanium nitride overlying the layer of titanium, and a layer of aluminum overlying the layer of titanium nitride. During the deposition process, the deposition temperature can be reduced to a temperature of approximately 160.0° C. or lower to achieve a thinner metal stack with a layer of aluminum having smaller grain size, which advantageously increases reflectivity. Thickness 358 of thin specialized metal layer 336 can be, for example, approximately 1100.0 Angstroms. The aluminum layer in thin specialized metal layer 336 can have a thickness of, for example, approximately 700.0 Angstroms.

At step 506a, protective oxide layer 337, a BARC, and a resist layer are sequentially formed over thin specialized metal layer 336 and the resist layer and the BARC are patterned to form a mask, in one embodiment. Protective oxide layer 337 can comprise a thin layer of silicon oxide and can be deposited over thin specialized metal layer 336 by utilizing a CVD process or other suitable deposition processes. The BARC can be, for example, a developable BARC, can comprise an organic material as known in the art, and can be formed by utilizing a suitable deposition process. The resist layer, which can comprise, for example, photoresist, and the BARC can be patterned in a photo process to form a mask over thin specialized metal layer 336.

At step 506b, protective oxide layer 337, a BARC, and a resist layer are sequentially formed over thin specialized metal layer 336 and the resist layer and the BARC are patterned to form a mask, in one alternative embodiment. Protective oxide layer 337 can comprise a thin layer of silicon oxide and can be deposited over thin specialized metal layer 336 by utilizing a CVD process or other suitable deposition processes. The BARC can be an organic material (i.e. an organic BARC) as known in the art, and can be formed by utilizing a suitable deposition process. The resist layer, which can comprise, for example, photoresist, can be patterned in a photo process to form a mask over the BARC and thin specialized metal layer 336.

At step 506c, a BARC and a resist layer are sequentially formed over thin specialized metal layer 336 and the resist layer is patterned to form a mask, in one alternative embodiment. The BARC, which can comprise an inorganic material such as silicon oxynitride (SiON), forms a protective coating on the surface of thin specialized metal layer 336 to protect it (i.e. the surface of thin specialized metal layer 336) from damage during subsequent processing. The BARC can be formed by depositing a layer of silicon oxynitride on thin specialized metal layer 336 by utilizing a CVD process or other suitable deposition processes. The resist layer, which can comprise, for example, photoresist, can be patterned in a photo process to form a mask over the BARC and thin specialized metal layer 336.

At step 508a, which is performed after step 506a in one embodiment, protective oxide layer 337 and thin specialized metal layer 336 can be etched to form an array of pixel electrodes including pixel electrodes 308 and 310. For example, pixel electrodes, such as pixel electrodes 308 and 310, can be formed by utilizing a plasma etch process or other suitable etch process to etch unmasked portions of protective oxide layer 337 and thin specialized metal layer 336. A serif, such as serif 459 in FIG. 4, can be formed at the corner of each pixel electrode so as to advantageously reduce the width of the gap formed at the corners of diagonally adjacent pixel electrodes. The serifs can be formed by, for example, utilizing a specialized OPC technique during photo processing. After the pixel electrodes have been formed, the mask formed by the patterned resist layer and the BARC can be removed by utilizing a suitable etch process as known in the art.

At step 508b, which is performed after step 506b in one alternative embodiment, the BARC, protective oxide layer 337, and thin specialized metal layer 336 can be etched to form an array of pixel electrodes including pixel electrodes 308 and 310. For example, pixel electrodes, such as pixel electrodes 308 and 310, can be formed by utilizing a plasma etch process or other suitable etch process to etch unmasked portions of the BARC, protective oxide layer 337, and thin specialized metal layer 336. A serif, such as serif 459 in FIG. 4, can be formed at the corner of each pixel electrode so as to advantageously reduce the width of the gap formed at the corners of diagonally adjacent pixel electrodes. The serifs can be formed by, for example, utilizing a specialized OPC technique during photo processing. After the pixel electrodes have been formed, the mask formed by the patterned resist layer and the BARC can be removed by utilizing a suitable etch process as known in the art.

At step 508c, which is performed after step 506c in one alternative embodiment, the BARC and thin specialized metal layer 336 can be etched to form an array of pixel electrodes including pixel electrodes 308 and 310. For example, pixel electrodes, such as pixel electrodes 308 and 310, can be formed by utilizing a plasma etch process or other suitable etch process to etch unmasked portions of the BARC and thin specialized metal layer 336. A serif, such as serif 459 in FIG. 4, can be formed at the corner of each pixel electrode so as to advantageously reduce the width of the gap formed at the corners of diagonally adjacent pixel electrodes. The serifs can be formed by, for example, utilizing a specialized OPC technique during photo processing. After the pixel electrodes have been formed, the mask formed by the patterned resist layer can be removed by utilizing a suitable etch process as known in the art. The remaining BARC at step 508c acts substantially in the same manner and same function as do the protective oxides in the 506a/508a and 506b/508b process flows.

At step 510, self-planarizing passivation dielectric 306 is formed over the pixel electrodes, such as pixel electrodes 308 and 310, in gap 354 formed between adjacent pixel electrodes. Self-planarizing passivation dielectric 306 can comprise an ONO stack formed by oxide layer 360, which is situated over pixel electrodes 308 and 310 and also situated in gap 354, nitride layer 362, which is situated over oxide layer 360, and oxide layer 364, which is situated over nitride layer 362. Self-planarizing passivation dielectric 306 has thickness 366, which can be equal to, for example, approximately twice width 356 of gap 354. By forming self-planarizing passivation dielectric 306 so as to have an appropriately selected thickness, such as a thickness equal to approximately two times width 356 of gap 354, the invention provides a self-planarizing passivation dielectric that has a sufficient thickness so as to minimize the size of trough 368, which can form on the top surface of the dielectric stack over gap 354.

As a result of the selected thickness of self-planarizing passivation dielectric 306, it (i.e. self-planarizing passivation dielectric 306) has substantially planar top surface. Self-planarizing passivation dielectric 306 can be formed by, for example, sequentially depositing oxide layer 360, nitride layer 362, and oxide layer 364 over pixel electrodes 308 and 310 and in gap 354 by utilizing a PECVD process or other suitable deposition processes. The deposition process can be performed at, for example, a deposition temperature of less than approximately 450.0° C. Other combinations of dielectric films such as oxide only, Oxide-Nitride (ON), ONO, and Oxide-Nitride-Oxide-Nitride (ONON) may also be used and the individual film thicknesses can be optimized to enhance reflectivity of the pixel electrode.

At step 512, openings are formed in ILD 312, which is the top interlayer dielectric of the semiconductor die, to expose respective bond pads (not shown in any of the figures) in the underlying pad metal layer, i.e. in metal layer 334. Thus, in the present invention, pixel electrodes are formed in a thin specialized metal layer, which is the top metal layer in the semiconductor die, and bond pads are formed in the pad metal layer, which is the metal layer situated one metal layer below the thin specialized metal layer.

Thus, the invention achieves a self-planarizing passivation dielectric that completely fills the gap formed between diagonally adjacent pixel electrodes and also advantageously provides a substantially planar top surface for effective integration with a liquid crystal portion (e.g. liquid crystal portion 104) in a LCoS structure (e.g. LCoS structure 100). Also, since the invention provides a passivation dielectric that is self-planarizing over pixel electrodes and the gap between the pixel electrodes, the invention advantageously avoids complicated planarization and etch back steps that are required to achieve a substantially planar passivation dielectric in a conventional semiconductor portion of a LCoS structure.

By forming pixel electrodes from a thin specialized metal layer including a thin aluminum layer, where the thin specialized metal layer is formed at a reduced deposition temperature, the invention also achieves a semiconductor portion of an LCoS structure having pixel electrodes including an aluminum layer with reduced grain size, which advantageously increases reflectivity. The invention further provides pixel electrodes that comprise a thinner metal stack with reduced hillock formation, which advantageously provides pixel electrodes with a substantially planar top surface. The invention also utilizes a specialized OPC technique to advantageously achieve a reduced gap width between diagonally adjacent pixel electrodes.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

The invention claimed is:

1. A liquid crystal on silicon (LCoS) structure comprising:
a plurality of pixel electrodes overlying an interlayer dielectric, said plurality of pixel electrodes having diagonally adjacent pixel electrodes separated by a gap;
a self-planarizing passivation dielectric situated over said plurality of pixel electrodes and in said gap, said self-planarizing passivation dielectric having a bottom surface formed from a dielectric layer filling said gap;
said self-planarizing passivation dielectric having a thickness; selected such that said self-planarizing passivation dielctric has a substantially planar top surface.

2. The LCoS structure of claim 1, wherein said thickness of said self-planarizing passivation dielectric is approximately equal to twice a width of said gap.

3. The LCoS structure of claim 1, wherein said self-planarizing passivation dielectric comprises an Oxide-Nitride-Oxide (ONO) stack.

4. The LCoS structure of claim 1, wherein each corner of each of said plurality of pixel electrodes has a serif, wherein said serif causes said gap to have a reduced width.

5. The LCoS structure of claim 1, wherein each of said plurality of pixel electrodes comprise a metal stack including a top layer of aluminum.

6. The LCoS structure of claim 5, wherein a thickness of said metal stack is less than 2000.0 Angstroms.

7. The LCoS structure of claim 5, wherein said metal stack is formed at a reduced deposition temperature less than approximately 200.0° C. so as to cause said top layer of aluminum to have a reduced grain size for increased reflectivity.

8. The LCoS structure of claim 7, wherein said reduced deposition temperature is less than approximately 160.0° C.

9. The LCoS structure of claim 1, wherein said gap has a width of between approximately 0.2 microns and approximately 0.36 microns.

10. The LCoS structure of claim 1 further comprising a protective oxide layer situated between said self-planarizing passivation dielectric and said plurality of pixel electrodes.

11. A method for forming a semiconductor portion of an LCoS structure, said method comprising steps of:
    forming an array of pixel electrodes over an interlayer dielectric, said array of pixel electrodes having diagonally adjacent pixel electrodes separated by a gap;
    using an optical proximity correction (OPC) technique to cause said gap to have a reduced width;
    forming a self-plaharizing passivation dielectric with a selected thickness over said array of pixel electrodes and in said gap, said selected thickness causing said self-planarizing passivation dielectric to have a substantially planar top surface.

12. The method of claim 11, wherein said selected thickness is approximately equal to twice a width of said gap.

13. The method of claim 11, wherein said self-planarizing passivation dielectric comprises an ONO stack.

14. The method of claim 11, wherein said step of forming said array of pixel electrodes comprises steps of:
    forming a thin specialized metal layer by depositing metal stack over said interlayer dielectric, said metal stack comprising a top aluminum layer;
    etching said thin specialized metal layer to form said array of pixel electrodes.

15. The method of claim 14, wherein said metal stack is deposited at a reduced deposition temperature less than approximately 200.0° C. so as to cause said top aluminum layer to have a reduced grain size for increased reflectivity.

16. The method of claim 15, wherein said reduced deposition temperature is less than approximately 160.0° C.

17. The method of claim 14, wherein said thin specialized metal layer has a thickness less than 2000.0 Angstroms.

18. The method of claim 11, wherein use of said OPC technique results in formation of a serif on each of said diagonally adjacent pixel electrodes, wherein said serif causes said gap to have said reduced width.

19. The method of claim 14 further comprising steps of sequentially depositing a protective oxide layer, a bottom anti-reflective coating (BARC), and a resist layer over said thin specialized metal layer and patterning said resist layer and said BARC prior to said etching said thin specialized metal layer.

20. The method of claim 14 further comprising steps of sequentially depositing an inorganic BARC and resist layer over said thin specialized metal layer and patterning said resist layer prior to said etching said thin specialized metal layer.

* * * * *